Figure 1:
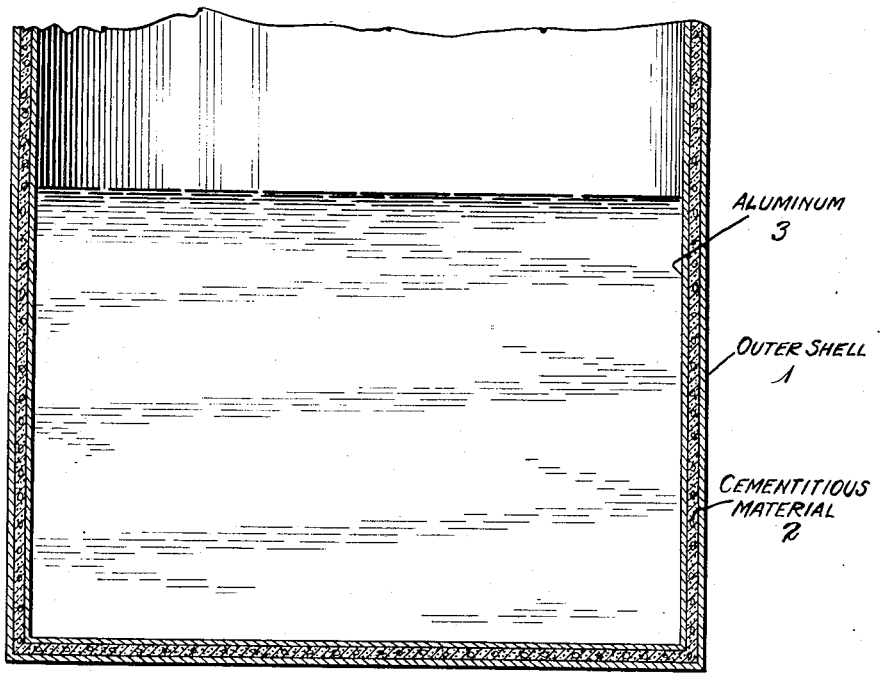

March 27, 1934.  G. EGLOFF ET AL  1,952,705

LINING FOR VESSELS HOLDING OIL

Filed July 18, 1929

Inventors
Gustav Egloff and
Charles D. Lowry, Jr.

By Frank L. Belknap
Attorney

Patented Mar. 27, 1934

1,952,705

UNITED STATES PATENT OFFICE 1,952,705

LINING FOR VESSELS HOLDING OIL

Gustav Egloff and Charles D. Lowry, Jr., Chicago, Ill., assignors to Universal Oil Products Company, Chicago, Ill., a corporation of South Dakota Application July 18, 1929, Serial No. 379,199

3 Claims. (Cl. 220—63)

This invention has for its object the provision of an improved lining for oil retaining vessels to resist corrosion. Oil tanks, stills and other containers are in many instances rapidly corroded, due to corrosive substances, especially hydrogen sulfide, in the oil they hold. The economic losses caused by this corrosion are enormous. Moreover, the corrosion of cracking stills and other equipment used under pressure may go on to such an extent that the equipment is thereby rendered unsafe for operation under the temperature and pressure conditions necessary for oil cracking. The invention is directed to reducing the great loss at present caused by corrosion, and to reducing the hazard of oil cracking processes.

Heretofore, several types of corrosion resisting linings have been proposed to check corrosion of oil containers. Some success has been attained by the use of cementitious linings. Of these two types have been employed. One type is the so called Ganister lining, made up by mixing Portland cement, sand and pulverized fire-brick with water, and applying this mixture by spraying or other means to the interior of a vessel, the vessel being lined with expanded metal lath to insure the adherence of the lining to the wall. A second type of lining is made up of furnace cement, sand, water glass and asbestos, deposited on the wall by spraying, and cured by careful heating.

These cementitious liners have been found in practice to have the disadvantage that in long periods of use they disintegrate and are gradually destroyed. This disintegration is not uniform over the entire surface, and instances occur when at some points in an oil retaining vessel the cementitious lining no longer offers protection to the steel wall, whereas, throughout the remainder of the vessel, the lining is intact.

The present invention embodies an improvement in cementitious linings for oil containing vessels. The improved lining we have devised is a combination of a cementitious lining with a thin layer of aluminum. It consists of a lining of cementitious material on the interior of an oil containing vessel, with a thin layer of aluminum of 0.002 inch or greater thickness overlaid upon the surface of said cementitious layer. The aluminum may be covered by an additional layer of cementitious liner, or it may be left to come in contact with the oil.

The employment of aluminum to resist corrosion, has met with marked success in petroleum technology. The use of a covering of aluminum in addition to a layer of cementitious material produces a liner of much greater durability than the use of cementitious material alone. In that form of the coating in which the aluminum is between two layers of cement-like material, the aluminum layer effectively checks the disintegration in spots that so detracts from the value of the ordinary linings. Should a small portion of the outer layer scale off, the wall would still remain protected by the layer of aluminum and inner layer of cement material, whereas were the cement material used alone, the disintegration would continue to the steel wall of the vessel. Where a thin imperforate layer of aluminum is used on the surface of a coating of cementitious material, the unbroken layer of aluminum effectively prevents any spots in the lining starting to disintegrate.

Figure 2:
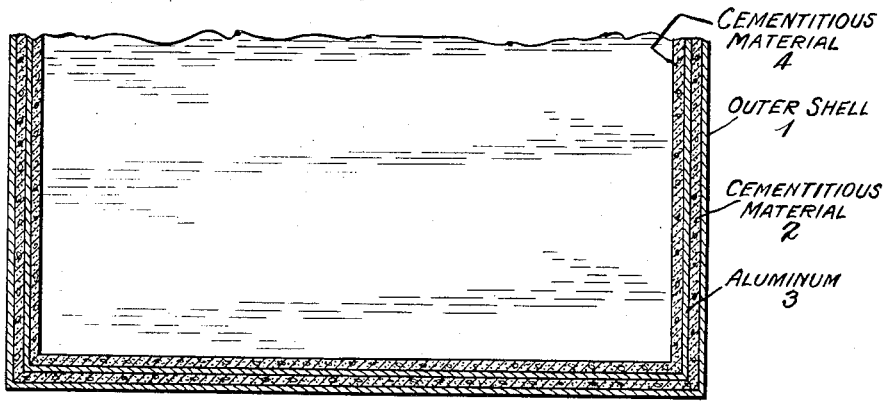

The accompanying diagrammatic drawing, not drawn to scale, illustrates embodiments of the improved liner as applied to reaction chambers of a cracking process or other vessels for holding oil. Figure 1 is a fragmentary cross section of a preferred embodiment of the invention and Figure 2 is a fragmentary cross section of a modified embodiment.

Referring in detail to the drawing, wherein like numerals refer to like parts and in the practice of our invention, we thoroughly clean the inner wall of a steel retort or other vessel for holding oil indicated by numeral 1. To this wall, we may affix some type of bonding unit not shown, such as expanded metal lath, to hold the coating. We then spray or otherwise apply a layer of a suitable non-corrosive cementitious mixture 2, such as the Ganister mixture, or the fire-clay, sand, water glass and asbestos mixture already referred to. Before this is thoroughly hard and while it still possesses adhesive qualities, we roll onto it sheets of aluminum foil 3 to form a continuous layer. Upon this aluminum layer we may or may not then affix a second layer of cementitious material 4, with or without the use of bonding or reinforcing units. For tanks or other containers in which the oil is not subject to turbulence, the single layer of cementitious material with a layer of aluminum on its face will probably be the most desirable liner; for reaction chambers of cracking units and other vessels where extreme conditions of agitation and deposition of carbonaceous matter occurs, the double lining of cement material with aluminum between the two layers will possess the greater durability.

By forming a vessel lining in this manner, we are able to use a thinner coating than has heretofore been necessary to protect the walls of steel vessels. By reason of its thinness, this coating is less harmed by changes in temperature and is, therefore, of greater durability and less subject to disintegration than heavier liners. Because of its tensile strength and elasticity, the aluminum coating is not easily ruptured and conforms readily to the layer of cementitious material upon which it is applied, forming a protection for this cementitious layer and for the steel wall.

From the foregoing it will be appreciated that the liner which has been described will be an effective resister of corrosion, may be economically applied, and will provide a double protection for the wall. The aluminum layer will be a protection against even partial disintegration of the cementitious material. The liner will, therefore, be of long life and great dependability and will insure over long periods the margin of safety necessary for the operation of high pressure oil conversion apparatus.

By the use of the term "cementitious protective lining" in the claims we intend to define corrosion resisting linings such as a mixture comprising Portland cement, sand, and pulverized fire brick with water or a mixture comprising furnace cement, sand, water glass and asbestos, and to exclude adhesive cements such as lacquers or varnishes. The term is also intended to be restricted to a protective lining which is relatively thick as compared with the aluminum layer bonded thereto.

We claim as our invention:

1. The method of protecting oil retaining vessels against corrosion by hydrogen sulfide and like substances contained in the oil, the steps which consist in spraying the walls of the vessel with a non-corrosive mineral cementitious material to form a protective lining and thereafter, before the cementitious material has set, applying a thin layer of aluminum thereon and causing the same to become bonded therewith.

2. The method of protecting oil retaining vessels against corrosion by hydrogen sulfide and like substances contained in the oil, the steps which consist in applying to the walls of the vessel a non-corrosive mineral cementitious material to form a relatively thick protective lining and thereafter, before the cementitious material has set, applying a thin layer of aluminum thereon and causing the same to become bonded therewith, said cementitious protective lining serving as a bonding agent.

3. A method of protecting oil retaining vessels against corrosion by hydrogen sulfide and other corrosive substances contained in the oil, the steps which consist in applying to the walls of the vessel a non-corrosive mineral cementitious material to form a protecting lining, thereafter, before the cementitious material has set, applying a thin layer of aluminum thereon and causing the same to become bonded therewith, and overlaying said aluminum layer with an additional layer of cementitious material.

GUSTAV EGLOFF.
CHARLES D. LOWRY, Jr.